US011566398B2

(12) United States Patent
Mattsson et al.

(10) Patent No.: US 11,566,398 B2
(45) Date of Patent: Jan. 31, 2023

(54) TRANSMISSION ARRANGEMENT

(71) Applicant: VOLVO CONSTRUCTION EQUIPMENT AB, Eskilstuna (SE)

(72) Inventors: Per Mattsson, Sölvvesborg (SE); Mathias Lehikoinen, Västerås (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 17/719,712

(22) Filed: Apr. 13, 2022

(65) Prior Publication Data
US 2022/0333341 A1 Oct. 20, 2022

(30) Foreign Application Priority Data

Apr. 16, 2021 (EP) ..................................... 21168772

(51) Int. Cl.
*F16H 3/64* (2006.01)
*E02F 9/20* (2006.01)

(52) U.S. Cl.
CPC ............. *E02F 9/202* (2013.01); *F16H 3/64* (2013.01); *F16H 2200/201* (2013.01); *F16H 2200/2038* (2013.01)

(58) Field of Classification Search
CPC ...... E02F 9/202; F16H 3/64; F16H 2200/201; F16H 2200/2038
See application file for complete search history.

(56) References Cited

U.S. PATENT DOCUMENTS

| | | | |
|---|---|---|---|
| 3,701,293 A | 10/1972 | Mori et al. | |
| 3,824,876 A | * 7/1974 | Mori | ..................... F16H 57/10 475/276 |
| 3,941,013 A | 3/1976 | Miller | |

(Continued)

FOREIGN PATENT DOCUMENTS

| | | | | |
|---|---|---|---|---|
| CN | 107120396 A | * | 9/2017 | ............... F16H 3/66 |
| CN | 107878171 A | | 4/2018 | |

(Continued)

OTHER PUBLICATIONS

Extended European Search Report, European Patent Application No. 21168772.8, dated Jul. 22, 2021, 7 pages.

(Continued)

*Primary Examiner* — Justin Holmes
(74) *Attorney, Agent, or Firm* — Sage Patent Group (57) ABSTRACT

A transmission arrangement comprises a first planetary gear set, a second planetary gear set, a third planetary gear set, an input shaft connectable to a prime mover, the input shaft being operatively connected to a sun gear of the second planetary gear set and to a sun gear of the third planetary gear set, an output shaft operatively connected to a ring gear of the first planetary gear set and to a planet carrier of the second planetary gear set. The transmission arrangement further includes a gear selection arrangement including a first locking mechanism connected to a planet carrier of the first planetary gear set, a second locking mechanism connected to a sun gear of the first planetary gear set, a ring gear of the second planetary gear set and to a planet carrier of the third planetary gear set, and a third locking mechanism.

15 Claims, 5 Drawing Sheets

(56) References Cited

U.S. PATENT DOCUMENTS

| | | | |
|---|---|---|---|
| 3,946,622 A * | 3/1976 | Murakami | F16H 3/66 475/287 |
| 4,205,563 A | 6/1980 | Gorrell | |
| 4,702,125 A | 10/1987 | Kains | |
| 5,078,663 A * | 1/1992 | Meffert | F16H 3/64 475/284 |
| 2004/0004871 A1 | 3/2004 | Turnback | |
| 2009/0186734 A1 | 7/2009 | Perkins | |
| 2010/0069195 A1 | 3/2010 | Baldwin | |
| 2013/0066529 A1 | 3/2013 | Murayama | |
| 2018/0216709 A1 | 8/2018 | Kim et al. | |
| 2019/0113109 A1 | 4/2019 | Mordukhovich et al. | |

FOREIGN PATENT DOCUMENTS

| | | |
|---|---|---|
| DE | 102017006262 A1 | 1/2019 |
| DE | 102018210897 A1 | 1/2020 |
| DE | 102019119947 A1 | 1/2021 |
| DE | 102019119952 A1 | 1/2021 |
| EP | 3266635 B1 | 12/2018 |
| JP | 2007131107 A | 5/2007 |
| KR | 19980047925 A * | 9/1998 |
| SE | 522675 C2 | 2/2004 |
| WO | WO 2020/105635 A1 | 5/2020 |

OTHER PUBLICATIONS

Extended European Search Report, European Patent Application No. 21168775.1, dated Jul. 26, 2021, 7 pages.

Extended European Search Report, European Patent Application No. 21168774.4, dated Oct. 11, 2021, 8 pages.

* cited by examiner

TRANSMISSION ARRANGEMENT

CROSS REFERENCE TO RELATED APPLICATIONS

This application claims foreign priority to European Patent Application No. 21168772.8, filed on Apr. 16, 2021, the disclosure and content of which is incorporated by reference herein in its entirety.

TECHNICAL FIELD

The present invention relates to a transmission arrangement. The invention also relates to a working machine comprising such a transmission arrangement. The invention is applicable on working machines within the fields of industrial construction machines or construction equipment, in particular electrically propelled haulers. Although the invention will be described with respect to a rigid hauler, the invention is not restricted to this particular machine, but may also be used in other working machines such as articulated haulers, wheel loaders, excavators and backhoe loaders, etc.

BACKGROUND

In connection with transportation of heavy loads at construction sites or the like, a working machine is often used. The working machines may be utilized for transportations in connection with road or tunnel building, sand pits, mines, forestry and similar environments, and are often provided in the form of an articulated hauler or a rigid hauler.

Recently, not only cars are using electric machines as prime mover(s) for propulsion, also working machines are striving to use such more environmentally friendly prime mover. However, within the rough terrain at which the working machine is frequently operated, it is required that the vehicle is able to operate in a desired manner, and high quality of the vehicle gearbox is necessary.

Conventionally, the gearbox is arranged for adjusting the speed and strength of the vehicle in dependency of the specific driving scenario. The gearbox comprises a transmission arrangement and depending on the specific type of gearbox, the transmission arrangement may comprise e.g. gear wheels in meshed connection with each other or planetary gear sets comprising a respective sun gear, ring gear and a planet carrier, or a transmission arrangement having a combination of gear wheels in meshed connection and one or more planetary gear sets.

Due to the difference in speed range of an electric machine compared to a conventional internal combustion engine (ICE), the operational demands for a gearbox of an electrically propelled vehicle differs from an ICE propelled vehicle. There is thus a desire to further improve the gearbox for a working machine.

SUMMARY

It is an object of the present disclosure to provide a transmission arrangement that improves the operational performance for a working machine propelled with one or more electric machines. This is achieved by a transmission arrangement according to claim 1.

According to a first aspect of the present invention, there is provided a transmission arrangement, comprising a first planetary gear set comprising a first sun gear, a first ring gear and a first planet carrier carrying a first set of planet gears, the first set of planet gears being in meshing engagement with the first ring gear and the first sun gear, a second planetary gear set comprising a second sun gear, a second ring gear and a second planet carrier carrying a second set of planet gears, the second set of planet gears being in meshing engagement with the second ring gear and the second sun gear, a third planetary gear set comprising a third sun gear, a third ring gear and a third planet carrier carrying a third set of planet gears, the third set of planet gears being in meshing engagement with the third ring gear and the third sun gear, an input shaft connectable to a prime mover, the input shaft being operatively connected to the second sun gear and to the third sun gear, an output shaft operatively connected to the first ring gear and to the second planet carrier, and a gear selection arrangement, comprising a first locking mechanism connected to the first planet carrier, a second locking mechanism connected to the first sun gear, the second ring gear and the third planet carrier, and a third locking mechanism connected to the third ring gear.

The wording "operatively connected to" should in the following and throughout the entire description be interpreted such that the components thereof are fixedly connected to each other, i.e. the rotational speed of the components which are operatively connected to each other is the same. Hence, no connecting mechanism or the like is arranged between the components that are operatively connected to each other and they can therefore not be disengaged from one another. In a similar vein, the wording "connected to" should be construed as components being either operatively connected to each other, or connected to each other via a transmission component, such as a gear wheel, or a clutch, etc.

By means of the above described transmission arrangement, a three-stage transmission is provided which is particularly advantageous for use in combination with a prime mover in the form of an electric machine. Thus, and according to an example embodiment, the prime mover may be an electric machine. The transmission arrangement provides for three gears using only locking mechanisms for obtaining the three different gear stages. According to an example embodiment, each of the first, second and third locking mechanisms may be arranged as a wet lamella brake. Hereby, a rapid and smooth changing between the gear stages is achieved while driving. In particular, gear shifting can, by the transmission arrangement, be carried out with retained power transfer. Other locking mechanisms are also conceivable, as will be evident by the below description.

Furthermore, the present invention enables for a transmission arrangement with relatively large gear ratio steps. Also, the three-stage transmission enables for a reduction of the rotational speed between the input shaft and the output shaft for each one of the three gear stages. These features are particularly advantageous for use in connection to a prime mover in the form of an electric machine.

According to an example embodiment, the transmission arrangement may further comprise an input shaft gear wheel arranged on the input shaft, the input shaft gear wheel being arranged in meshing engagement with a first gear wheel and a second gear wheel, wherein the first gear wheel is connectable to a first prime mover, and the second gear wheel is connectable to a second prime mover.

An advantage is that the transmission arrangement can be mechanically connected to two individually controlled prime movers via the first gear wheel and the second gear wheel, respectively. The input shaft gear wheel is thus preferably arranged as a reduction gear. By using two prime movers, the power requirements for each individually controlled prime mover can hereby be reduced. Thus, in the preferred case of using electric machines as prime movers, two smaller electric machines, in terms of electric power requirement, can be chosen instead of one larger electric machine requiring larger power for propulsion. Alternatively, two relatively large electric machines can be used, providing an increased motive power for the working machine.

According to an example embodiment, the gear selection arrangement may be adapted to assume three gear stages, wherein a first gear stage is obtainable by solely locking the first locking mechanism, a second gear stage is obtainable by solely locking the second locking mechanism, and a third gear stage is obtainable by solely locking the third locking mechanism.

Hereby, only one locking mechanism is actuated for each gear stage. An advantage is that wear of the locking mechanisms can be reduced as the locking mechanisms will not need to be actuated for each gear. Also, the engagement of only one locking mechanism for each gear stage implies that change between two different gear stages can be achieved in a fast and smooth manner whilst still requiring few components.

According to an example embodiment, a stationary gear ratio for each of the first, second and third planetary gear sets may be negative.

According to an example embodiment, the transmission arrangement may comprise a transmission housing, the transmission housing comprising a housing wall assembly defining a transmission housing cavity enclosing at least the first, second and third planetary gear sets, wherein at least an external portion of each one of the first and second locking mechanisms is located on one side of the transmission housing wall assembly and the transmission housing cavity is located on an opposite side of the transmission housing wall assembly.

By means of the above, at least a portion of each one of the first and second locking mechanisms may be kept outside, or on the outside of, the transmission housing. Such a position implies that e.g. repair and maintenance operations may be performed in a straightforward manner.

According to an example embodiment, at least an external portion of the third locking mechanism may be located on the opposite side of the transmission housing wall compared to the transmission housing cavity. Hereby, also at least the external portion of the third locking mechanism may be kept outside, or on the outside of, the transmission housing.

According to an example embodiment, the first locking mechanism may be adapted to be controlled by a first fluid pressure conducted to the first locking mechanism such that for at least a first fluid pressure equal to zero overpressure, the first locking mechanism is adapted to assume a locked condition in which the first planet carrier is locked to the transmission housing, and the second locking mechanism may be adapted to be controlled by a second fluid pressure conducted to the second locking mechanism such that for at least a second fluid pressure equal to zero overpressure, the second locking mechanism is adapted to assume a locked condition in which the first sun gear, the second ring gear and the third planet carrier are locked to the transmission housing.

Hereby, the first and second locking mechanisms may be used in an energy efficient manner as a parking brake for instance. As such, in an embodiment in which a wheel or the like is connected to the transmission arrangement, the first and second locking mechanisms may be used for locking such a wheel. When it is desired that e.g. the first planet carrier be kept stationary for a certain amount of time, such a stationary condition may be achieved by simply reducing the first fluid pressure, possibly down towards or to zero overpressure. Thus, the first planet carrier may be kept stationary without the need for operating a fluid pressure source, such as a pump. The same applies when keeping the first sun gear, the second ring gear and the third planet carrier stationary. According to an example embodiment, the third locking mechanism may be adapted to be controlled by a third fluid pressure conducted to the third locking mechanism such that for at least a third fluid pressure equal to zero overpressure, the third locking mechanism is adapted to assume a locked condition in which the third ring gear is locked to the transmission housing. In a similar vein as for the first and second locking mechanisms, when it is desired that the third ring gear be kept stationary for a certain amount of time, such a stationary condition may be achieved by simply reducing the third fluid pressure, possibly down towards or to zero overpressure.

According to an example embodiment, the first locking mechanism may comprise a first biasing member, preferably a first spring arrangement, adapted to bias the first locking mechanism so as to assume the locked condition, and the second locking mechanism may comprise a second biasing member, preferably a second spring arrangement, adapted to bias the second locking mechanism so as to assume the locked condition. The above-mentioned biasing members imply a cost and energy efficient implementation of the locking mechanisms in order to obtain the desired characteristics thereof.

In a similar vein, and according to an example embodiment, the third locking mechanism may comprise a third biasing member, preferably a third spring arrangement, adapted to bias the third locking mechanism so as to assume the locked condition.

According to an example embodiment, the transmission housing cavity may contain a transmission lubrication liquid, wherein at least the external portion of each one of the first and second locking mechanisms is adapted to be in non-contact with the transmission lubrication liquid. An advantage is that the locking mechanisms are kept dry. In a similar vein, and according to an example embodiment, at least the external portion of the third locking mechanism is adapted to be in non-contact with the transmission lubrication liquid.

According to an example embodiment, the first locking mechanism may comprise a first brake disc and a first brake caliper, and the second locking mechanism may comprise a second brake disc and a second brake caliper. Using a brake disc and a brake caliper may be particularly advantageous for a locking mechanism used as a parking brake. According to an example embodiment, the third locking mechanism may comprise a third brake disc and a third brake caliper.

According to an example embodiment, the external portion of the first locking mechanism may comprise the first brake disc and the first brake caliper, and the external portion of the second locking mechanism may comprise the second brake disc and the second brake caliper. Thus, the first brake disc and the first brake caliper as well as the second brake disc and the second brake caliper may be kept outside, or on the outside of, the transmission housing, which implies that e.g. repair and maintenance operations may be performed in a straightforward manner.

According to an example embodiment, the external portion of the third locking mechanism may comprise the third brake disc and the third brake caliper.

According to an example embodiment, the gear selection arrangement may be adapted to assume a locked condition in which each of the first and second locking mechanisms assumes a locked condition. Hereby, and as indicated above, the first and second locking mechanisms can be used in an energy efficient manner as a parking brake.

According to an example embodiment, the third locking mechanism may be designed as a dog clutch. Hereby, a reduction of drag losses in the third locking mechanism is achieved.

According to a second aspect, there is provided a vehicle comprising at least one prime mover and a transmission arrangement according to any one of the embodiments described above in relation to the first aspect, wherein the at least one prime mover is connected to the input shaft of the transmission arrangement, and wherein the output shaft is adapted to feed power to a set of ground engaging members of the vehicle.

According to an example embodiment, the gear selection arrangement may assume a parking brake functionality for the vehicle when each of the first and second locking mechanisms assumes a locked condition.

Hereby, and as described above, the first and second locking mechanisms may be used in an energy efficient manner as a parking brake. In detail, the first and second locking mechanisms may here be used for locking the ground engaging member.

Further effects and features of the second aspect of the present invention are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAIL DESCRIPTION

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Figure 1:
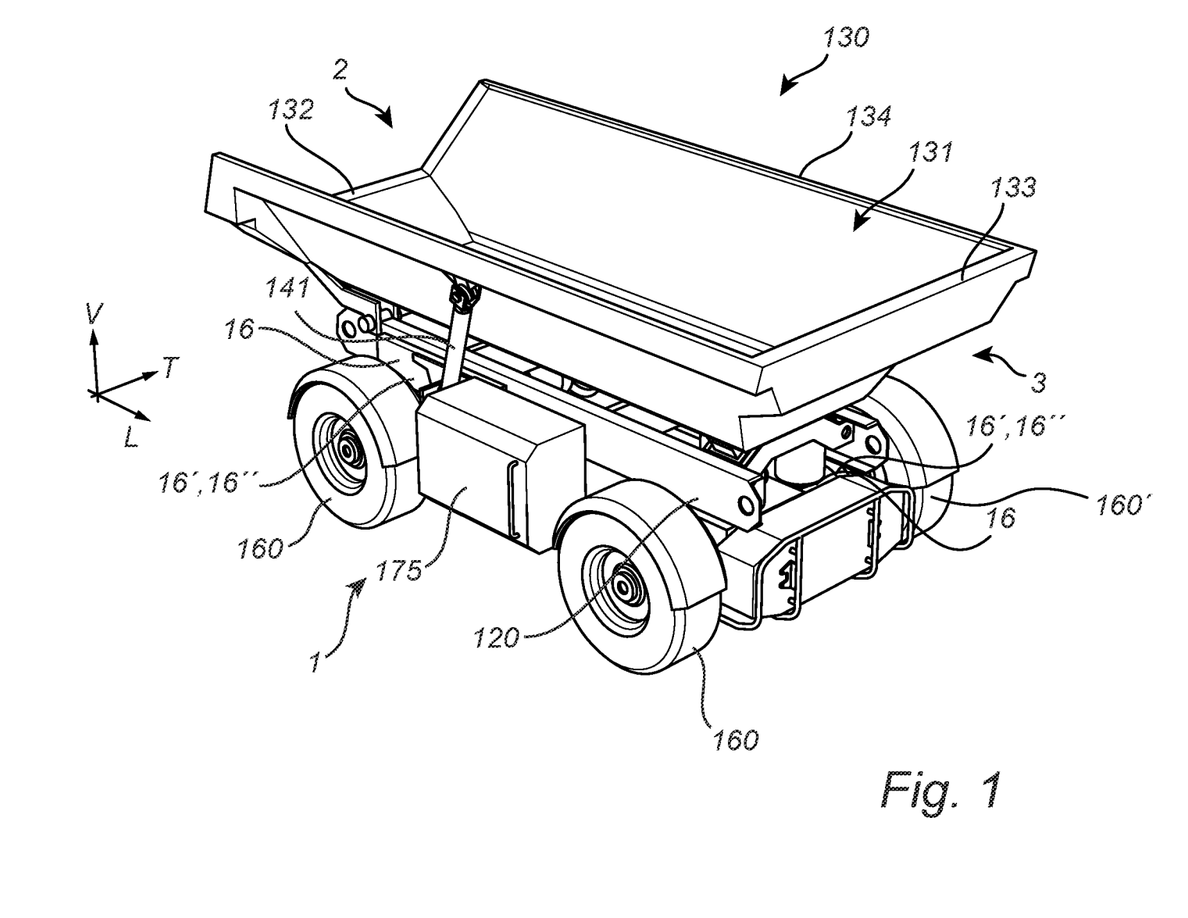
FIG. 1 is a perspective view of a working machine according to one embodiment.

With reference to FIG. 1, a working machine 1 is according to an example embodiment depicted. The inventive concept is applicable on any working machines within the fields of industrial construction machines or construction equipment, in particular dumpers/haulers. Although the invention will be described with respect to a rigid hauler, the invention is not restricted to this particular machine, but may also be used in other working machines such as articulated haulers, excavators, backhoe loaders and wheel loaders.

As seen in FIG. 1 the working machine comprises a dump body 130 for accommodating a load. Merely as an example, and as is indicated in FIG. 1, the dump body 130 may be a loading platform of the working machine 1. The working machine 1 is adapted to have a load receiving condition in which the dump body 130 comprises an open load receiving area 131 outwardly delimited by a load receiving area circumference 134. Generally, the open load receiving area 131 may be an area that is directly accessible from the environment surrounding the working machine 1. For instance, the open load receiving area 131 may be an area that is directly accessible from the above of the dump body 130.

The working machine does not have a driver seat, but is intended to be autonomously and/or remotely driven. The machine further comprises a first side 3 and a second side 2 arranged opposite to the first side 3, the second side 2 being a load dumping side 2. The first side 3 may also be referred to as an opposite side 3. The opposite side 3 may be used as a front end side when the machine is driven in the direction that puts the opposite side 3 first. However, the working machine 1 may be drivable in any direction, i.e. it is bidirectional. Further, the dump body 130 comprises a load dumping end portion 132 arranged on the working machines load dumping side 2, and an opposite end portion 133 arranged on the working machines opposite side 3.

Further, still referring to FIG. 1 the working machine 1 comprises a working machine frame 120 to which a pair of propulsion axles 16 is mounted. Each propulsion axle 16 comprises, amongst other things, drive shafts 16', 16". The working machine frame 120 further supports the dump body 130, and thereby carries the load of anything contained in the dump body 130 as well as the weight from the dump body itself. The propulsion axles 16 are connected to ground engaging members 160, 160' for driving the ground engaging members 160, 160'. In FIG. 1 the ground engaging members 160, 160' are illustrated as wheels, however, they may also be crawlers.

Further, a prime mover, in the following referred to as an electric motor 36 (see FIG. 2) is installed onto the propulsion axle 16 and coupled to the drive shafts 16', 16". As will be evident from FIG. 2, the electric motor 36 is coupled to the drive shafts 16', 16" via a transmission arrangement 38. The working machine may comprise one electric motor 36 on each propulsion axle 16.

Still further, the working machine 1 may comprise a tilting arrangement, such as a tilting arrangement comprising one or more tilting actuators 141, such as hydraulic actuators, for tilting the dump body 130 of the working machine 1. The tilting arrangement is in one end attached to the frame 120 and in the other end to the dump body 130. Preferably, the tilting arrangement comprises two tilting actuators 141 arranged at different sides of the dump body to ensure a stable tilting (not shown).

FIG. 1 finally discloses an electrical control arrangement 175, arranged to the frame of the working machine 1. The electrical control arrangement 175 may comprise a power source (not shown) e.g. a battery arrangement, for supporting the electric motor 36 and any other components with power. Further, the electrical control arrangement 175 may comprise a control unit (not shown) for controlling the working machine. The control unit may be capable of receiving a remote control signal to enable the working machine to be remotely controlled. Such a signal may be received from an external transmitting unit (not shown). It may further be capable of communicating any information to or from the working machine from or to a remote server (not shown). Such information may comprise usage data, service information, battery status, load, weight, capacity utilization or any other relevant information.

The working machine is thus propelled by a powertrain 34 (see FIGS. 2 and 3), including the electric motor 36 for propulsion of the working machine. In order to describe the powertrain in further detail, reference is therefore now made to FIG. 2, which is a schematic top view of a powertrain comprising a transmission arrangement 38 according to an example embodiment. The FIG. 2 powertrain is exemplified as being adapted to propel the ground engaging members 160, 160' associated with the front propulsion axle 16. The propulsion axle 16 thus at least comprises the above described drive shafts 16', 16" arranged at the opposite side 3 of the vehicle 1. However, the FIG. 2 powertrain may be used for propelling any ground engaging member or members, for instance the ground engaging members associated with the drive shafts arranged at the dumping side 2 of the vehicle 1.

Figure 2:
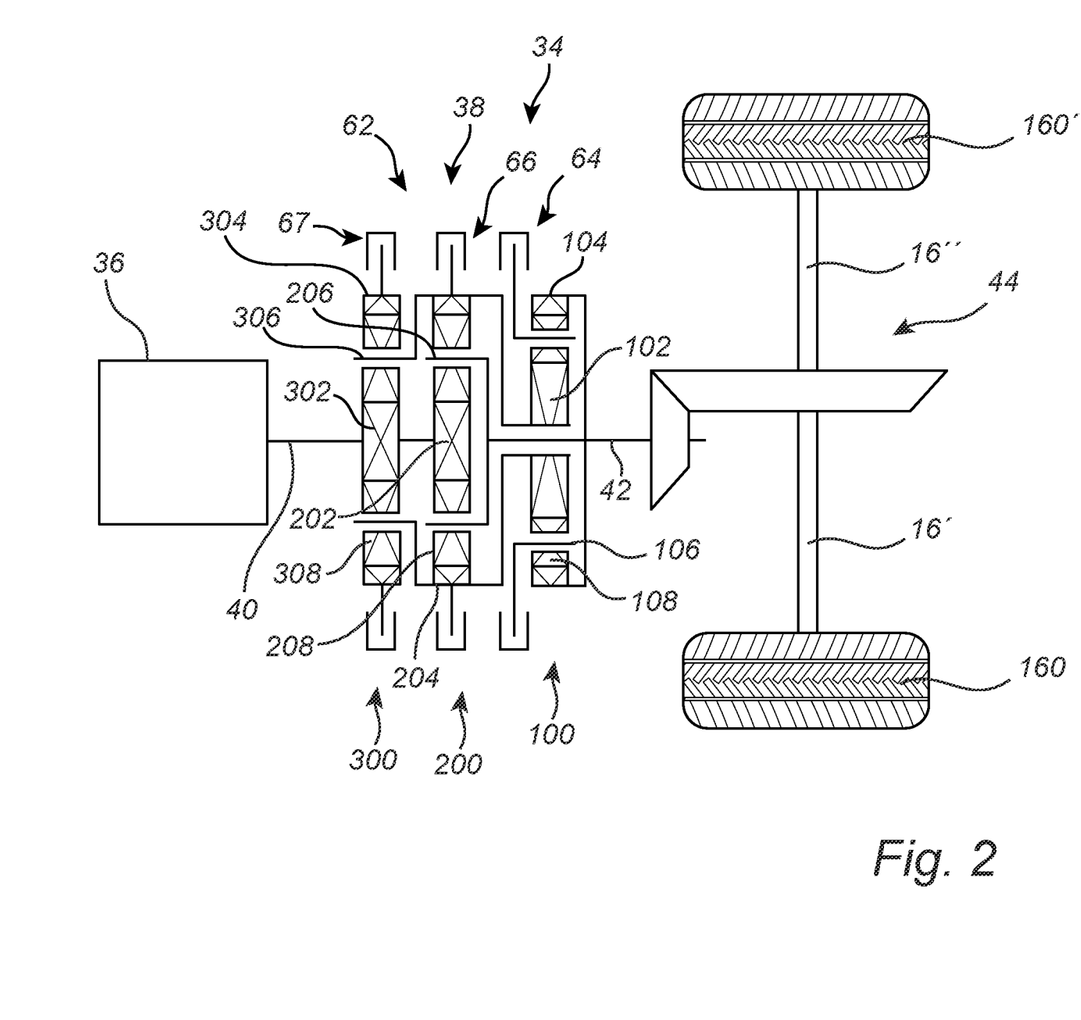
FIG. 2 is a schematic top view of a powertrain comprising a transmission arrangement according to an example embodiment.

Irrespective of the intended use, the FIG. 2 powertrain 34 comprises an electric motor 36, a set of ground engaging members 160, 160' and a transmission arrangement 38 comprising an input shaft 40 and an output shaft 42. The electric motor 36 is adapted to feed power to the input shaft 40 and the output shaft 42 is adapted to feed power to the set of ground engaging members 160, 160'.

Purely by way of example, and as indicated in FIG. 2, an output shaft of the electric motor 36 may be rotationally fixedly connected to the input shaft 40. However, it is also envisaged that the output shaft of the electric motor 36 may be connected to the input shaft 40 via one or more other components, such as one or more transmission components (not shown in FIG. 2).

Furthermore, the output shaft 42 may be connected to the set of ground engaging members 160, 160' via a gear set 44, such as a bevel gear unit 44, and further via the drive shafts 16', 16". However, it is also envisaged that the output shaft 42 may be connected to the set of ground engaging members 160, 160' in other ways. For instance, it is contemplated that embodiments of the powertrain 34 may comprise an output shaft 42 that is adapted to be connected to the set of ground engaging members 160, 160' using other or fewer intermediate components than what has been exemplified above with reference to FIG. 2. As a non-limiting example, it is envisaged that the output shaft 42 may be rotationally fixedly connected to a ground engaging member 160, 160'. For instance, it is contemplated that the powertrain 34 may form a hub motor assembly for a vehicle, such as a working machine.

As can be seen in FIG. 2, the transmission arrangement 38 comprises a first planetary gear set 100, a second planetary gear set 200 and a third planetary gear set 300. The first planetary gear set 100 comprises a first sun gear 102, a first ring gear 104 and a first planet carrier 106 carrying a first set of planet gears 108. The first set of planet gears 108 are in meshing engagement with the first ring gear 104 and the first sun gear 102. The second planetary gear set 200 comprises a second sun gear 202, a second ring gear 204 and a second planet carrier 206 carrying a second set of planet gears 208. The second set of planet gears 208 are in meshing engagement with the second ring gear 204 and the second sun gear 202. The third planetary gear set 300 comprises a third sun gear 302, a third ring gear 304 and a third planet carrier 306 carrying a third set of planet gears 308. The third set of planet gears 308 are in meshing engagement with the third ring gear 304 and the third sun gear 302.

The transmission arrangement 38 further comprises the above described input shaft 40 and output shaft 42. The input shaft 40 is operatively connected to the second sun gear 202 and to the third sun gear 302, and connectable to the electric motor 36. The input shaft 40 can be directly connected to the electric motor 36 or connected to the electric motor 36 via a transmission component, such as a clutch or, as will be described below with reference to FIG. 3, a gear set. The output shaft 42 is operatively connected to the first ring gear 104 and to the second planet carrier 206.

Furthermore, and according to transmission arrangement 38 exemplified in FIG. 2, the first sun gear 102 is operatively connected to the second ring gear 204 and to the third planet carrier 306. The second sun gear 202 is operatively connected to the third sun gear 302.

The transmission arrangement 38 further comprises a gear selection arrangement 62 for controlling the transmission arrangement 38 to assume various gear conditions. In particular, the transmission arrangement 38 depicted and described in the following is configured to assume three different gear conditions. The gear selection arrangement comprises a first locking mechanism 64, a second locking mechanism 66, and a third locking mechanism 67. According to the example embodiment of FIG. 2, the first locking mechanism 64 is preferably connected to the first planet carrier 106. The second locking mechanism 66 is preferably connected to the first sun gear 102, the second ring gear 204 and to the third planet carrier 306. The third locking mechanism 67 is preferably connected to the third ring gear 304. A detailed description of example embodiments for the first 64, second 66 and third 67 locking mechanisms will be described further below with reference to FIGS. 4A and 4B.

Figure 3:
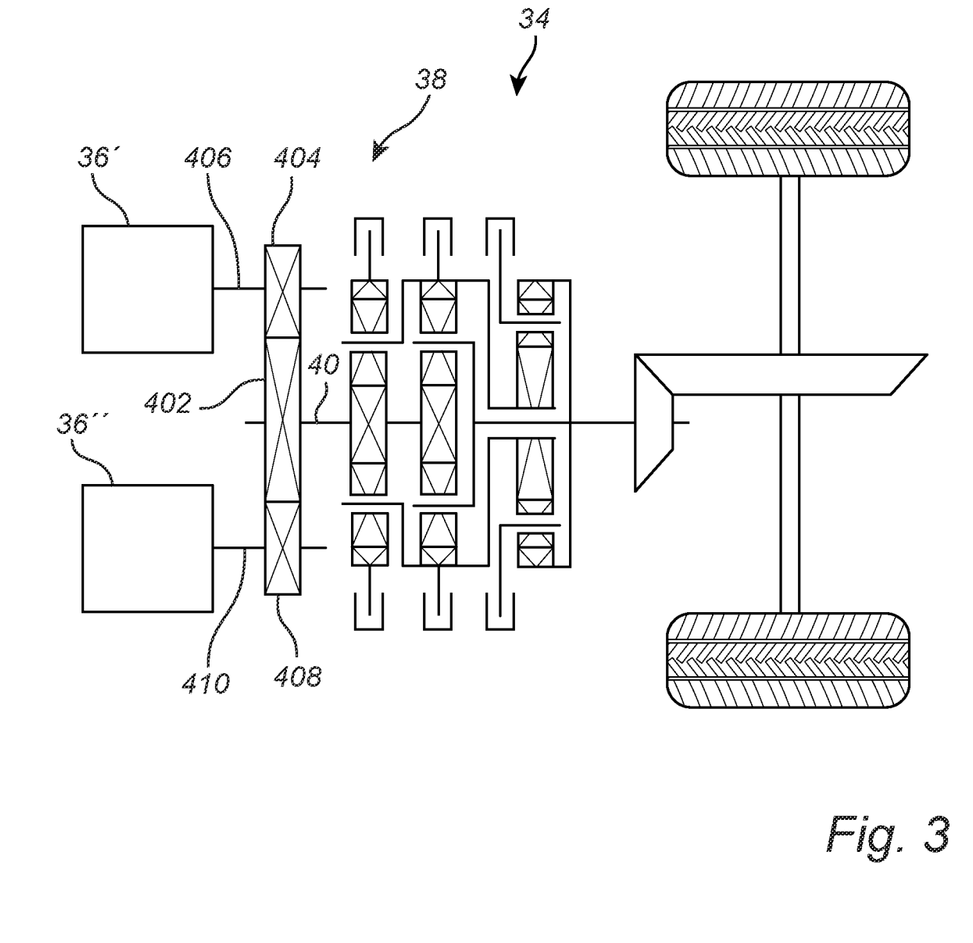
FIG. 3 is a schematic top view of a powertrain comprising a transmission arrangement according to another example embodiment.

In order to describe the transmission arrangement according to another example embodiment, reference is now made to FIG. 3. The description in relation to FIG. 3 will only focus on the differences compared to the example embodiment described above in relation to FIG. 2. Thus, the features of the example embodiment described above in relation to FIG. 2 are also applicable for the example embodiment described below, unless stated otherwise.

As can be seen in FIG. 3, the powertrain 34 comprises a first prime mover 36' and a second prime mover 36". The first prime mover 36' is preferably a first electric motor 36' and the second prime mover 36" is preferably a second electric motor 36". Thus, the FIG. 3 powertrain 34 comprises two electric motors 36', 36" compared to the single electric motor 36 described above in relation to the FIG. 2 powertrain 34.

According to the FIG. 3 example embodiment, the transmission arrangement 38 comprises an input shaft gear wheel 402 arranged on the input shaft 40. The transmission arrangement 38 also comprises a first gear wheel 404 connected to the first electric motor 36' via a first electric motor output shaft 406, and a second gear wheel 408 connected to the second electric motor 36" via a second electric motor output shaft 410. The input shaft gear wheel 402 is in meshing engagement with the first gear wheel 404 and with the second gear wheel 408. Hereby, power is transmitted from the first electric motor 36' to the input shaft 40 via the first gear wheel 404 and the input shaft gear wheel 402. In a similar vein, power is transmitted from the second electric motor 36" to the input shaft 40 via the second gear wheel 408 and the input shaft gear wheel 402. The gear stage including the input shaft gear wheel 402, the first gear wheel 404 and the second gear wheel 408 is preferably arranged as a pair of reduction gears to the input shaft 40.

Figure 4A:
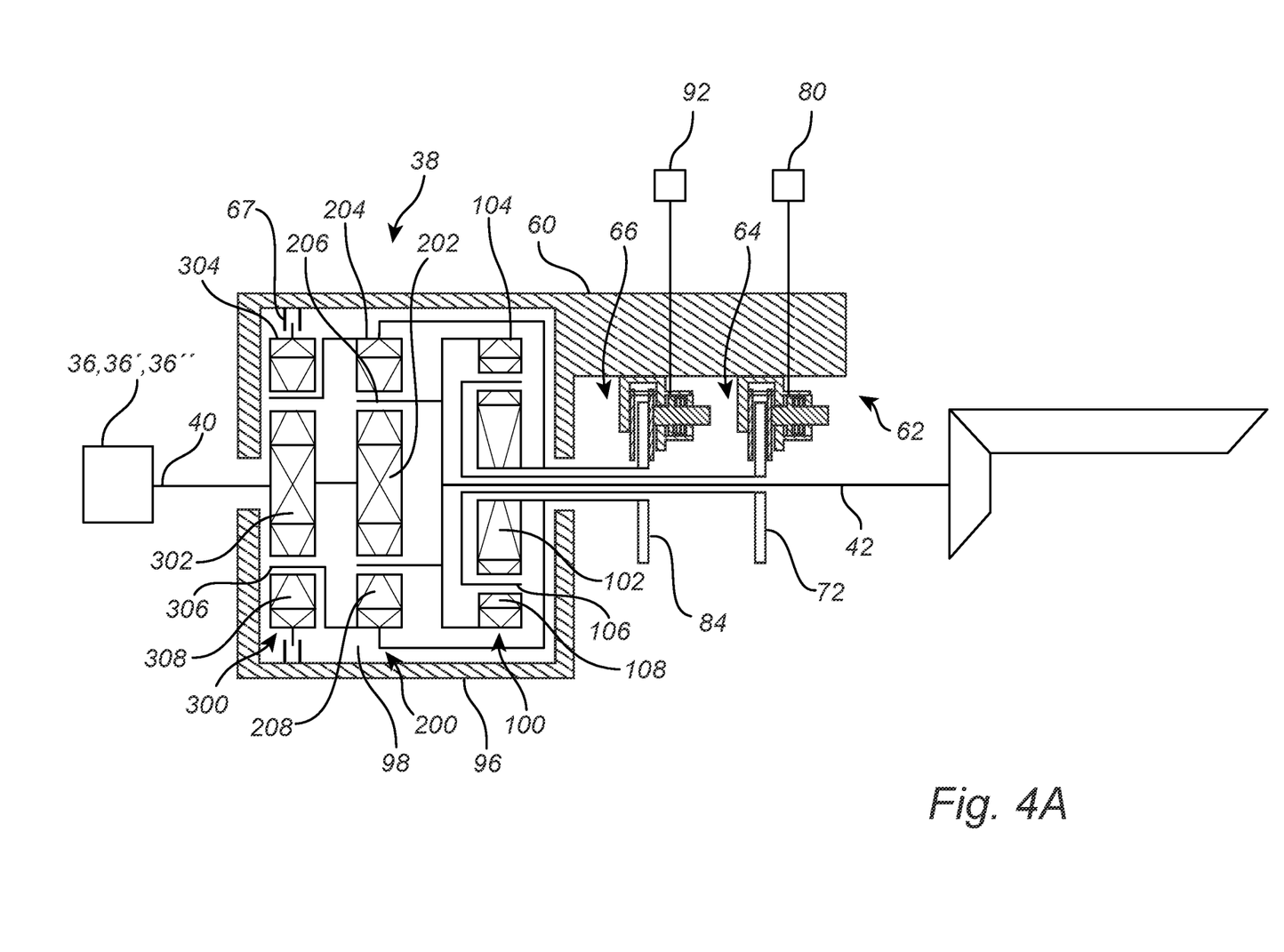
FIG. 4A is a schematic top view of a transmission arrangement according to an example embodiment.

In order to describe the transmission arrangement 38 in further detail, reference is made to FIG. 4A which is a schematic top view of a transmission arrangement 38 according to an example embodiment. The transmission arrangement 38 comprises the above described first 100, second 200 and third 300 planetary gear sets. As is also illustrated in FIG. 4A, the transmission arrangement 38 further comprises a transmission housing 60 as well as the above described gear selection arrangement 62. The input shaft 40 is connected to the electric motor 36, 36', 36", which electric motor can be arranged according to any one of the above described example embodiments depicted in FIGS. 2 and 3.

The first locking mechanism 64 is preferably adapted to be controlled by a first fluid pressure conducted to the first locking mechanism 64 such that for at least a first fluid pressure equal to zero overpressure, the first locking mechanism 64 is adapted to assume a locked condition in which the first planet carrier 106 is locked to the transmission housing 60. In a similar vein, the second locking mechanism 66 is preferably adapted to be controlled by a second fluid pressure conducted to the second locking mechanism 66 such that for at least a second fluid pressure equal to zero overpressure, the second locking mechanism 66 is adapted to assume a locked condition in which the second ring gear 204 is locked to the transmission housing 60. The third locking mechanism 67 is preferably arranged as a wet lamella brake within the transmission housing 60. According to a non-limiting example, the third locking mechanism 67 is designed as a dog clutch.

Furthermore, and purely by way of example, the implementation of the gear selection arrangement 62 is such that the first locking mechanism 64 is further adapted to assume a set of first locking mechanism non-locked conditions in which the first planet carrier 106 is allowed to rotate relative to the transmission housing 60, and wherein the second locking mechanism 66 is further adapted to assume a set of second locking mechanism non-locked conditions in which the second ring gear 204 is allowed to rotate relative to the transmission housing 60, whereby for a first fluid pressure equal to or higher than a first fluid pressure threshold, the first locking mechanism 64 is adapted to assume a released condition in which the first planet carrier 106 is free to rotate relative to the transmission housing 60, wherein the released condition is forming part of the set of first locking mechanism non-locked conditions. Also, for at least one first intermediate pressure between zero overpressure and the first fluid pressure threshold, the first locking mechanism 64 is adapted to assume a slipping condition in which a relative rotation is allowed but braking torque is applied between the transmission housing 60 and the first planet carrier 106, wherein the slipping condition is forming part of the set of first locking mechanism non-locked conditions. Moreover, for a second fluid pressure equal to or higher than a second fluid pressure threshold, the second locking mechanism 66 is adapted to assume a released condition in which the second ring gear 204 is free to rotate relative to the transmission housing 60, wherein the released condition is forming part of the set of second locking mechanism non-locked conditions. Also, for at least one second intermediate pressure between zero overpressure and the second fluid pressure threshold, the second locking mechanism 66 is adapted to assume a slipping condition in which a relative rotation is allowed but braking torque is applied between the transmission housing 60 and the second ring gear 204, wherein the slipping condition is forming part of the set of second locking mechanism non-locked conditions.

The third locking mechanism 67 may also, in a similar vein as the first 64 and second 66 locking mechanisms, be adapted to be controlled by a third fluid pressure conducted to the third locking mechanism 67 such that for at least a third fluid pressure equal to zero overpressure, the third locking mechanism 67 is adapted to assume a locked condition in which the third ring gear 304 is locked to the transmission housing 60. When the third fluid pressure is equal to or higher than a third fluid pressure threshold, the third locking mechanism is adapted to assume a released condition in which the third ring gear 304 is free to rotate relative to the transmission housing 60, wherein the released condition is forming part of a set of third locking mechanism non-locked conditions.

The first locking mechanism 64 may be implemented in a plurality of ways. Purely by way of example, the first locking mechanism 64 may be implemented as an on-off locking mechanism, such as a dog clutch, adapted to assume either a fully locked or a fully released condition. As such, though purely by way of example, the set of first locking mechanism non-locked conditions may contain only one non-locked condition, i.e. a fully released condition as exemplified above.

In a similar vein, the second locking mechanism 66 may be implemented in a plurality of ways. Purely by way of example, the second locking mechanism 66 may be implemented as an on-off locking mechanism, such as a dog clutch, adapted to assume either a fully locked or a fully released condition. As such, though purely by way of example, the set of second locking mechanism non-locked conditions may contain only one non-locked condition, i.e. a fully released condition as exemplified above.

Furthermore, each one of the first locking mechanism 64 and the second locking mechanism 66 may preferably be arranged as a parking brake. As such, each one of the first 64 and second 66 locking mechanisms may be implemented such that it assumes a locked condition at least when a fluid pressure conducted to the locking mechanism is equal to zero overpressure.

Implementations of the first 64 and second 66 locking mechanisms are hereinafter presented with reference to FIG. 4B which illustrates a portion of the example embodiment depicted in FIG. 4A. As may be gleaned from FIG. 4B, the first locking mechanism 64 comprises a first biasing member 68, which first biasing member 68 is implemented as a first spring arrangement in FIG. 4B, adapted to bias the first locking mechanism 64 so as to assume the locked condition and wherein the second locking mechanism 66 comprises a second biasing member 70, which second biasing member 70 is implemented as a second spring arrangement in FIG. 4B, adapted to bias the second locking mechanism 66 so as to assume the locked condition.

Figure 4B:
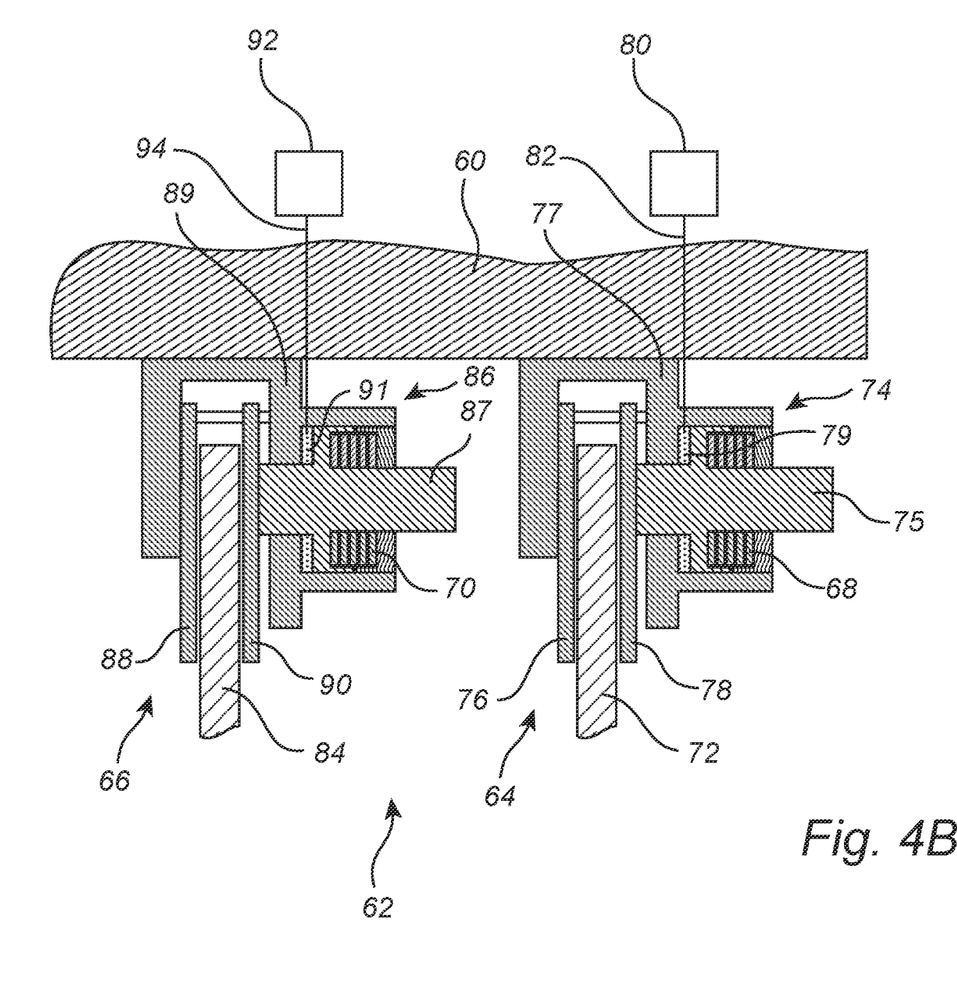
FIG. 4B illustrates a portion of the example embodiment depicted in FIG. 4A.

In the FIG. 4B implementation, the first biasing member 68 is implemented as a disc spring, although other types of biasing members are also envisaged, such as a helical spring or the like. In a similar vein, in the FIG. 4B implementation, the second biasing member 70 is implemented as a disc spring, although other types of biasing members are also envisaged, such as a helical spring or the like.

In the FIG. 4B implementation, the first locking mechanism 64 comprises a first brake disc 72 and a first brake caliper 74. The first brake caliper 74 includes a first caliper body 77 that holds two brake pads 76, 78 located on opposite sides of the first brake disc 72. A first piston 75 is positioned within the first caliper body 77. The first piston 75 is biased in a direction towards the first brake disc 72 by means of the first biasing member 68 to thereby bias the brake pad 78 towards the first brake disc 72. Purely by way of example, in order to apply a braking torque to the first brake disc 72, the first brake caliper 74 may be fixedly connected to the transmission housing 60 in at least the direction of the needed reaction force.

Moreover, the FIG. 4B implementation of the first brake caliper 74 is a so called floating caliper. As such, the FIG. 4B implementation of the first brake caliper 74 can move with respect to the first brake disc 72, along a line parallel to the axis of rotation of the first brake disc 72. Thus, when the first biasing member 68 has pushed one of the brake pads 78, via the first piston 75, such that it makes contact with the first brake disc 72, the first caliper body 77 then slides and pulls the other brake pad 76 so that pressure is applied to both sides of the first brake disc 72.

However, it should be noted that other implementations are also envisaged. Purely by way of example, the implementations of the first locking mechanism 64 may comprise two biasing members (not shown), each one of which being adapted to bias an individual brake pad 76, 78 towards the first brake disc 72. As such, the first brake caliper 74 need not necessarily be a so called floating caliper.

The first brake caliper 74 is in turn connected to a first fluid source 80, for instance via a fluid conduit 82 as exemplified in FIG. 4B. Purely by way of example, the first fluid source 80 may be a tank or a pump and the fluid may for instance be a gas, such as air, or a liquid, such as a hydraulic fluid, for instance hydraulic oil. In the FIG. 4B implementation, the first brake caliper 74 controls the two brake pads 76, 78 such that when the first brake caliper 74 is fed with fluid having a fluid pressure from the fluid source 80, the first brake caliper 74 releases the two brake pads 76, 78 from contact with the first brake disc 72.

In the FIG. 4B implementation of the first locking mechanism 64, the first fluid source 80 is fluidly connected to a first fluid cavity 79 formed between the first piston 75 and the first caliper body 77. As such, a fluid pressure applied in the first fluid cavity 79 will impart a force onto the first piston 75 in a direction opposite to the force generated by the first biasing member 68, thus forcing the two brake pads 76, 78 away from each other.

In the FIG. 4B implementation, the first biasing member 68 and the first fluid pressure applied in the first fluid cavity 79 interact such that for at least a first fluid pressure equal to zero overpressure, the first locking mechanism 64 is adapted to assume the above-mentioned locked condition. In such a condition, the biasing force from the first biasing member 68 exceeds the force by which the first fluid pressure releases the two brake pads 76, 78 from the first brake disc 72. It should also be noted that the first locking mechanism 64 may be adapted to assume the above-mentioned locked condition also when a first fluid pressure is greater than zero overpressure.

Furthermore, for a first fluid pressure equal to or higher than the first fluid pressure threshold, the first locking mechanism 64 is adapted to assume a released condition in which the first planet carrier 106 is free to rotate relative to the transmission housing 60. In such a condition, the biasing force from the first biasing member 68 does not exceed the force by which the first fluid pressure releases the two brake pads 76, 78 from the first brake disc 72 such that there is no contact between the first brake disc 72 and any one of the brake pads 76, 78.

Still further, for at least one first intermediate pressure between zero overpressure and the first fluid pressure threshold, the first locking mechanism 64 is adapted to assume a slipping condition in which a relative rotation is allowed but braking torque is applied between the transmission housing 60 and the first planet carrier 106. In a slipping condition, there is contact between the first brake disc 72 and at least one of, preferably both, the brake pads 76, 78 but wherein the first brake disc 72 nevertheless is allowed to rotate relative to the brake pads 76, 78.

In a similar vein as for the first locking mechanism 64, in the FIG. 4B implementation, the second locking mechanism 66 comprises a second brake disc 84 and a second brake caliper 86. The second brake caliper 86 includes a second caliper body 89 that holds two brake pads 88, 90 located on opposite sides of the second brake disc 84. A second piston 87 is positioned within the second caliper body 89. The second piston 87 is biased in a direction towards the second brake disc 84 by means of the second biasing member 70 to thereby bias the brake pad 90 towards the second brake disc 84. Purely by way of example, in order to apply a braking torque to the second brake disc 84, the second brake caliper 86 may be fixedly connected to the transmission housing 60 in at least the direction of the needed reaction force.

Moreover, the FIG. 4B implementation of the second brake caliper 86 is a so called floating caliper. As such, the FIG. 4B implementation of the second brake caliper 86 can move with respect to the second brake disc 84, along a line parallel to the axis of rotation of the second brake disc 84. As such, when the second biasing member 70 has pushed one of the brake pads 90, via the second piston 87, such that it makes contact with the second brake disc 84, the second caliper body 89 then slides and pulls the other brake pad 88 so that pressure is applied to both sides of the second brake disc 84.

However, it should be noted that other implementations are also envisaged. Purely by way of example, the implementations of the second locking mechanism 66 may comprise two biasing members (not shown), each one of which being adapted to bias an individual brake pad towards the second brake disc 84. As such, the second brake caliper 86 need not necessarily be a so called floating caliper.

The second brake caliper 86 is in turn connected to a second fluid source 92, for instance via a fluid conduit 94 as exemplified in FIG. 4B. Purely by way of example, the second fluid source 92 may be a tank or a pump and the fluid may for instance be a gas, such as air, or a liquid, such as a hydraulic fluid, for instance hydraulic oil.

In the FIG. 4B implementation of the second locking mechanism 66, the second fluid source 92 is fluidly connected to a second fluid cavity 91 formed between the second piston 87 and the second caliper body 89. As such, a fluid pressure applied in the second fluid cavity 91 will impart a force onto the second piston 87 in a direction opposite to the force generated by the second biasing member 70, thus releasing the two brake pads 88, 90 from contact with the second brake disc 84.

Although the first 80 and second 92 fluid sources are illustrated as separate entities in FIG. 4B, it is also envisaged that the embodiments of the transmission arrangement 38 may comprise a single fluid source feeding fluid to each one of the first 64 and second 66 locking mechanisms.

In the FIG. 4B implementation, the second brake caliper 86 controls the two brake pads 88, 90 such that when the second brake caliper 86 is fed with fluid having a fluid pressure from the fluid source 92, the second brake caliper 86 forces the two brake pads 88, 90 away from each other.

In the FIG. 4B implementation, the second biasing member 70 and the second fluid pressure applied in the second fluid cavity 91 interact such that for at least a second fluid pressure equal to zero overpressure, the second locking mechanism 66 is adapted to assume a locked condition in which the second ring gear 204 is locked to the transmission housing 60. In such a condition, the biasing force from the second biasing member 70 exceeds the force by which the second fluid pressure releases the two brake pads 88, 90 from contact with the second brake disc 84. It should also be noted that the second locking mechanism 66 may be adapted to assume the above-mentioned locked condition also when a second fluid pressure is greater than zero overpressure.

Furthermore, for a second fluid pressure equal to or higher than a second fluid pressure threshold, the second locking mechanism 66 is adapted to assume a released condition in which the second ring gear 204 is free to rotate relative to the transmission housing 60. In such a condition, the biasing force from the second biasing member 70 does not exceed the force by which the second fluid pressure releases the two brake pads 88, 90 from contact with the second brake disc 84 such that there is no contact between the second brake disc 84 and any one of the brake pads 88, 90.

Still further, for at least one second intermediate pressure between zero overpressure and the second fluid pressure threshold, the second locking mechanism 66 is adapted to assume a slipping condition in which a relative rotation is allowed but braking torque is applied between the transmission housing 60 and the second ring gear 204. In a slipping condition, there is contact between the second brake disc 84 and at least one of, preferably both, the brake pads 88, 90 but wherein the second brake disc 84 nevertheless is allowed to rotate relative to the brake pads 88, 90.

Moreover, again with reference to FIG. 4A, in embodiments of the transmission arrangement 38, the transmission housing 60 may comprise a transmission housing wall assembly 96 defining a transmission housing cavity 98 enclosing at least the first 100, second 200, and third 300 planetary gear sets. Moreover, as indicated in FIG. 4A, in embodiments of the transmission arrangement 38, at least an external portion of each one of the first 64 and second 66 locking mechanisms is located on one side of the transmission housing wall assembly 96 and the transmission housing cavity 98 is located on an opposite side of the transmission housing wall assembly. As is depicted in the example embodiment of FIG. 4A, the third locking mechanism 67 is located on the same side of the transmission housing wall assembly 96 as the transmission housing cavity 98.

Purely by way of example, and as indicated in FIG. 4B, the external portion of the first locking mechanism 64 may comprise the first brake disc 72 and the first brake caliper 74 and the external portion of the second locking mechanism 66 may comprise the second brake disc 84 and the second brake caliper 86.

Moreover, the transmission housing cavity may contain a transmission lubrication liquid (not shown in the figures), wherein at least the external portion of each one of the first and second locking mechanisms 64, 66 is adapted not to be in contact with the transmission lubrication liquid.

As described above, the gear selection arrangement is adapted to assume three gear stages, also referred to as gear conditions. The first gear stage is obtainable by solely locking the first locking mechanism 64, the second gear stage is obtainable by solely locking the second locking mechanism 66, and the third gear stage is obtainable by solely locking the third locking mechanism 67.

By means of the above description, the gear selection arrangement 62 can assume a first gear condition in which the first locking mechanism 64 assumes the locked condition and in which the second locking mechanism 66 assumes one of a set of second locking mechanism non-locked conditions, and the third locking mechanism 67 assumes one of a set of third locking mechanism non-locked condition. As such, in the first gear condition, the first planet carrier 106 is locked to the transmission housing 60. Thus, in the first gear condition, the first sun gear 102 drives the second ring gear 204 to rotate backwards. As a consequence, the output shaft 42 is rotating slower in the first gear condition than in the below described second gear condition in which the second ring gear 204 is stationary.

As a non-limiting example, the set of second locking mechanism non-locked conditions comprises the released condition of the second locking mechanism 66 when the gear selection arrangement 62 assumes the first gear condition. In a similar vein, the set of third locking mechanism non-locked conditions comprises the released condition of the third locking mechanism 67 when the gear selection arrangement 62 assumes the first gear condition.

As another non-limiting example, the second locking mechanism 66 may, when the gear selection arrangement 62 assumes the first gear condition, be adapted to assume a slipping condition in which a relative rotation is allowed but braking torque is applied between the transmission housing 60 and the first sun gear 102, the second ring gear 204 and the third planet carrier 306. The set of second locking mechanism non-locked conditions comprises the slipping condition of the second locking mechanism 66.

The gear selection arrangement 62 can also assume a second gear condition in which the second locking mechanism 66 assumes the locked condition and in which the first locking mechanism 64 assumes one of a set of first locking mechanism non-locked conditions, and the third locking mechanism 67 assumes one of a set of third locking mechanism non-locked conditions. As such, in the second gear condition, the second ring gear 204 is locked to the transmission housing 60, as a consequence of which power is transferred from the input shaft 40, via the second sun gear 202 and the second planet carrier 206 to the output shaft 42. Thus, in the second gear condition, the power flow only passes the second planetary gear set 200, whereas in the first gear condition described above, there is also a parallel power flow through the first planetary gear set 100.

The gear selection arrangement can also assume a third gear condition in which the third locking mechanism 67 assumes the locked condition and in which the first locking mechanism 64 assumes one of a set of first locking mechanism non-locked conditions, and the second locking mechanism 66 assumes one of a set of second locking mechanism non-locked conditions. As such, in the third gear condition, the third ring gear 304 is locked to the transmission housing 60. Thus, in the third gear condition, the third planet carrier 306 drives the second ring gear 204 to rotate in a forward direction. As a consequence, the output shaft 42 is rotating faster in the third gear condition than in the second gear condition, where the second ring gear 204 is stationary, as described above. In the third gear condition, there are parallel power flows through the second planetary gear set 200 and the third planetary gear set 300.

As a non-limiting example, the set of first locking mechanism non-locked conditions comprises the released condition of the first locking mechanism 64 when the gear selection arrangement 62 assumes the second and third gear conditions.

As another non-limiting example, the first locking mechanism 64 may, when the gear selection arrangement 62 assumes the second or third gear conditions, be adapted to assume a slipping condition in which a relative rotation is allowed but braking torque is applied between the transmission housing 60 and the first planet carrier 106. The set of first locking mechanism non-locked conditions comprises the slipping condition of the first locking mechanism 64.

Furthermore, and as indicated above, the gear selection arrangement 62 may be adapted to assume a locked condition in which the first locking mechanism 64 assumes the locked condition and the second locking mechanism 66 assumes the locked condition. In the locked condition, the transmission arrangement 38 will prevent the output shaft 42 from rotating. As such, the locked condition may be used for preventing the set of ground engaging members 160, 160' connected to the output shaft 42 from rotating, such that the transmission arrangement 38 then acts as a parking brake.

Moreover, in embodiments of the transmission arrangement 38 in which the second locking mechanism 66 is adapted to assume a slipping condition, the gear selection arrangement 62 may assume the first gear condition and the second locking mechanism 66 may be used for braking the set of ground engaging members 160, 160' when the vehicle is still moving by applying an actuating force to the second locking mechanism 66.

In a similar vein, in embodiments of the transmission arrangement 38 in which the first locking mechanism 64 is adapted to assume a slipping condition, the gear selection arrangement 62 may assume the second gear condition and the first locking mechanism 64 may be used for braking the set of ground engaging members 160, 160' when the vehicle is still moving by applying an actuating force to the first locking mechanism 64.

In a similar vein, either one, or both, of the first 64 and second 66 locking mechanisms may be adapted to assume a slipping condition when the gear selection arrangement 62 assumes the third gear condition. The first 64 and/or second 66 locking mechanisms may thus be used for braking the set of ground engaging members 160, 160' when the vehicle is still moving by applying an actuating force to the first 64 and/or second 66 locking mechanisms.

It is to be understood that the present invention is not limited to the embodiments described above and illustrated in the drawings; rather, the skilled person will recognize that many changes and modifications may be made within the scope of the appended claims. For example, although the present invention has mainly been described in relation to a rigid hauler, the invention should be understood to be equally applicable for any type of vehicle.

The invention claimed is:

1. A transmission arrangement, comprising:
a first planetary gear set comprising a first sun gear, a first ring gear and a first planet carrier carrying a first set of planet gears, the first set of planet gears being in meshing engagement with the first ring gear and the first sun gear,
a second planetary gear set comprising a second sun gear, a second ring gear and a second planet carrier carrying a second set of planet gears, the second set of planet gears being in meshing engagement with the second ring gear and the second sun gear,
a third planetary gear set comprising a third sun gear, a third ring gear and a third planet carrier carrying a third set of planet gears, the third set of planet gears being in meshing engagement with the third ring gear and the third sun gear,
an input shaft connectable to a prime mover, the input shaft being operatively connected to the second sun gear and to the third sun gear,
an output shaft operatively connected to the first ring gear and to the second planet carrier, and
a gear selection arrangement, comprising:
a first locking mechanism connected to the first planet carrier,
a second locking mechanism connected to the first sun gear, the second ring gear and the third planet carrier, and
a third locking mechanism connected to the third ring gear.

2. The transmission arrangement according to claim 1, wherein the transmission arrangement further comprises an input shaft gear wheel arranged on the input shaft, the input shaft gear wheel being arranged in meshing engagement with a first gear wheel and a second gear wheel, wherein the first gear wheel is connectable to a first prime mover, and the second gear wheel is connectable to a second prime mover.

3. The transmission arrangement according to claim 1, wherein the gear selection arrangement is adapted to assume three gear stages, wherein a first gear stage is obtainable by solely locking the first locking mechanism, a second gear stage is obtainable by solely locking the second locking mechanism, and a third gear stage is obtainable by solely locking the third locking mechanism.

4. The transmission arrangement according to claim 1, wherein the transmission arrangement comprises a transmission housing, the transmission housing comprising a housing wall assembly defining a transmission housing cavity enclosing at least the first, second and third planetary gear sets, wherein at least an external portion of each one of the first and second locking mechanisms is located on one side of the transmission housing wall assembly and the transmission housing cavity is located on an opposite side of the transmission housing wall assembly.

5. The transmission arrangement according to claim 4, wherein
the first locking mechanism is adapted to be controlled by a first fluid pressure conducted to the first locking mechanism such that:
for at least a first fluid pressure equal to zero overpressure, the first locking mechanism is adapted to assume a locked condition in which the first planet carrier is locked to the transmission housing, and
the second locking mechanism is adapted to be controlled by a second fluid pressure conducted to the second locking mechanism such that:
for at least a second fluid pressure equal to zero overpressure, the second locking mechanism is adapted to assume a locked condition in which the first sun gear, the second ring gear and the third planet carrier are locked to the transmission housing.

6. The transmission arrangement according to claim 5, wherein the first locking mechanism comprises a first biasing member, preferably a first spring arrangement, adapted to bias the first locking mechanism so as to assume the locked condition, and wherein the second locking mechanism comprises a second biasing member, preferably a second spring arrangement, adapted to bias the second locking mechanism so as to assume the locked condition.

7. The transmission arrangement according to claim 1, wherein the first locking mechanism comprises a first brake disc and a first brake caliper, and the second locking mechanism comprises a second brake disc and a second brake caliper.

8. The transmission arrangement according to claim 7, wherein the transmission arrangement comprises a transmission housing, the transmission housing comprising a housing wall assembly defining a transmission housing cavity enclosing at least the first, second and third planetary gear sets, wherein at least an external portion of each one of the first and second locking mechanisms is located on one side of the transmission housing wall assembly and the transmission housing cavity is located on an opposite side of the transmission housing wall assembly, and wherein the external portion of the first locking mechanism comprises the first brake disc and the first brake caliper, and wherein the external portion of the second locking mechanism comprises the second brake disc and the second brake caliper.

9. The transmission arrangement according to claim 1, wherein the gear selection arrangement is adapted to assume a locked condition in which each of the first and second locking mechanisms assumes a locked condition.

10. The transmission arrangement according to claim 4, wherein at least an external portion of the third locking mechanism is located on the opposite side of the transmission housing wall compared to the transmission housing cavity.

11. The transmission arrangement according to claim 10, wherein the third locking mechanism is adapted to be controlled by a third fluid pressure conducted to the third locking mechanism such that:

for at least a third fluid pressure equal to zero overpressure, the third locking mechanism is adapted to assume a locked condition in which the third ring gear is locked to the transmission housing.

12. A vehicle comprising at least one prime mover and a transmission arrangement according to claim 1, wherein the at least one prime mover is connected to the input shaft of the transmission arrangement, and wherein the output shaft is adapted to feed power to a set of ground engaging members of the vehicle.

13. The vehicle according to claim 12, wherein the gear selection arrangement assumes a parking brake functionality for the vehicle when each of the first and second locking mechanisms assumes a locked condition.

14. The vehicle according to claim 12, wherein the at least one prime mover is an electric machine.

15. The vehicle according to claim 12, wherein the vehicle is a working machine.

\* \* \* \* \*